United States Patent
Garner et al.

(10) Patent No.: US 7,712,774 B2
(45) Date of Patent: *May 11, 2010

(54) TENSION-BASED AIRBAG MOUNTING SYSTEM

(75) Inventors: Brett R. Garner, South Weber, UT (US); Kurt Gammill, Layton, UT (US)

(73) Assignee: Autoliv ASP, Inc., Ogden, UT (US)

(*) Notice: Subject to any disclaimer, the term of this patent is extended or adjusted under 35 U.S.C. 154(b) by 503 days.

This patent is subject to a terminal disclaimer.

(21) Appl. No.: 11/593,426

(22) Filed: Nov. 6, 2006

(65) Prior Publication Data

US 2008/0106073 A1 May 8, 2008

(51) Int. Cl.
*B60R 21/20* (2006.01)
*B60R 21/213* (2006.01)

(52) U.S. Cl. .......... 280/730.2; 280/728.2; 280/743.2

(58) Field of Classification Search ............ 280/730.2, 280/743.1, 743.2, 728.2
See application file for complete search history.

(56) References Cited

U.S. PATENT DOCUMENTS

| | | |
|---|---|---|
| 3,774,936 A | 11/1973 | Barnett et al. |
| 5,232,244 A | 8/1993 | Itoh |
| 5,462,308 A | 10/1995 | Seki et al. |
| 6,135,497 A | 10/2000 | Sutherland et al. |
| 6,464,250 B1 | 10/2002 | Faigle et al. |
| 6,494,486 B2 | 12/2002 | Pausch et al. |
| 7,165,783 B2 | 1/2007 | Karlbauer et al. |
| 7,172,212 B2 * | 2/2007 | Aoki et al. ............ 280/730.2 |
| 2002/0175502 A1 | 11/2002 | Tesch et al. |
| 2003/0116946 A1 | 6/2003 | Roos |
| 2004/0140653 A1 | 7/2004 | Bossecker et al. |
| 2008/0106073 A1 | 5/2008 | Garner et al. |
| 2008/0106084 A1 | 5/2008 | Mitchell et al. |

FOREIGN PATENT DOCUMENTS

| | | |
|---|---|---|
| WO | WO 2006/083246 | 8/2006 |
| WO | WO 2006/083246 A1 * | 8/2006 |

OTHER PUBLICATIONS

Interview Summary issued Oct. 19, 2009 in co-pending U.S. Appl. No. 11/593,282.
Supplemental Response to Office Action filed Oct. 29, 2009 in co-pending U.S. Appl. No. 11/593,282.
Amendment and Response to Office Action filed Sep. 22, 2009 in co-pending U.S. Appl. No. 11/593,282.
Office Action issued Apr. 29, 2009 in co-pending U.S. Appl. No. 11/593,282.
Response to Election of Species filed Mar. 4, 2009 in co-pending U.S. Appl. No. 11/593,282.
Office Action issued Feb. 12, 2009 in co-pending U.S. Appl. No. 11/593,282.

* cited by examiner

*Primary Examiner*—Ruth Ilan
(74) *Attorney, Agent, or Firm*—Sally J Brown; Stoel Rives LLP

(57) ABSTRACT

An airbag assembly including a tension mounting mechanism is disclosed. In one embodiment, an inflatable curtain is coupled to a one-way locking mechanism via an attaching element to provide tension along the longitudinal mounting surface of the inflatable curtain during its installation adjacent the vehicle roof rail.

19 Claims, 3 Drawing Sheets

TENSION-BASED AIRBAG MOUNTING SYSTEM

TECHNICAL FIELD

The present disclosure relates generally to the field of automotive protective systems. More specifically, the present disclosure relates to airbag mounting systems, such as inflatable curtain airbag mounting systems.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION

Figure 1:
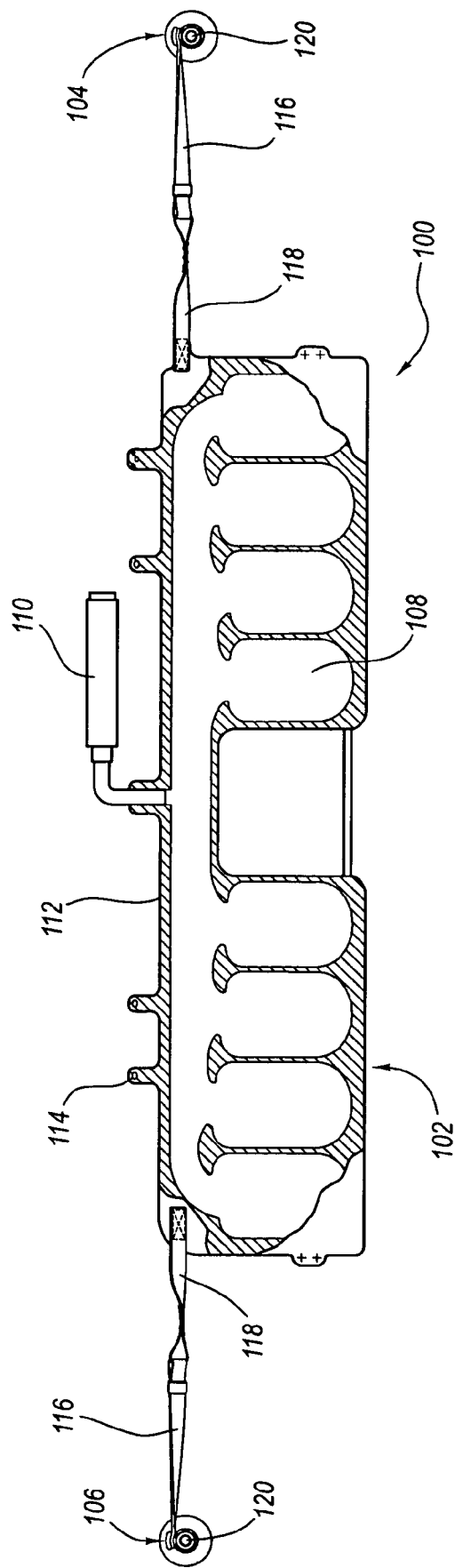
FIG. 1 is a side elevation view of an inflatable curtain airbag coupled to one embodiment of a tensioning mounting mechanism at both ends of the inflatable curtain.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side of seats, adjacent the roof rail of the vehicle, in an overhead position, or at the knee or leg position.

Inflatable curtain airbags may be used to protect the passengers of a vehicle during a side collision or roll-over collision. Inflatable curtains typically extend longitudinally within the vehicle and are usually coupled to or next to the roof rail of the vehicle. The inflatable curtain may expand in a collision scenario along the side of the vehicle between the vehicle passengers and the side structure of the vehicle. In a deployed state, an inflatable curtain may cover at least a portion of the side windows and the B-pillar of the vehicle. In some embodiments, inflatable curtains may extend from the A-pillar to the C-pillar of the vehicle. In alternative embodiments, inflatable curtains may extend from the A-pillar to the D-pillar of the vehicle.

Inflatable curtain airbags are typically installed adjacent the roof rail of a vehicle in an undeployed state, where the curtain airbag is rolled or folded or a combination thereof and optionally located within a sock. Conventionally, inflatable curtains include attachment tabs at the top edge and at various locations along the longitudinal length of the inflatable curtain. During a conventional installation, bolts or other fasteners are used to attach each attachment tab to the roof rail or similar structure of the vehicle.

The conventional process of affixing each attachment tab to the roof rail of a vehicle through a fastener often requires a relatively significant amount of assembly and installation time and requires a lot of hardware, such as multiple bolts or other fasteners.

FIG. 1 depicts one embodiment of an airbag assembly 100 as shown from a side elevation view. The airbag assembly 100 comprises an inflatable curtain airbag 102 and first and second tensioning mechanisms 104, 106. In other embodiments, alternative airbags may be used, such as front, side, overhead and knee airbags.

The inflatable curtain 102 of FIG. 1 includes an inflatable portion and an uninflatable portion. The inflatable portion includes inflatable chambers 108, which are in fluid communication with an inflator 110. The inflator 110 may be a pyrotechnic, gas-generating device to rapidly produce inflation gas in a collision scenario. Chambers 108 receive the inflation gas generated by inflator 110, and provide impact protection for vehicle occupants during a collision.

In one embodiment, the inflator 110 is positioned near the center adjacent the top edge 112 of the inflatable curtain 102, in the mid-fill position. In alternative embodiments, the inflator 110 may be located at either end of the inflatable curtain 102, in the end-fill position. The inflator 110 may be mounted to the vehicle body with screws, clips, hooks or alternative methods appreciated by those having skill in the art with the aid of the present disclosure.

The inflatable curtain 102 also may include an uninflatable portion that defines the chambers 108 and extends along the edges of the inflatable curtain 102. The uninflatable top edge 112 of the inflatable curtain 102 may comprise the mounting surface which is mounted to or adjacent to the roof rail of the vehicle (not shown). The top edge 112 may have a plurality of mounting orifices 114, such as slots, disposed in tabs that extend from the top edge 112. Alternatively, the mounting orifices are disposed in the fabric of the inflatable curtain 102.

During installation, the mounting orifices 114 of the inflatable curtain 102 are positioned to receive corresponding hooks or protrusions that extend from the vehicle, such as the roof rail of the vehicle. The hooks may be stamped into or attached to the car body.

In order to maintain the inflatable curtain 102 in its desired mounting position along the roof rail of the vehicle, a tensioning force is supplied at one or both ends of the inflatable curtain 102. In alternative embodiments, the tensioning force may be applied near a mid-section of the curtain 102 or some alternative position.

In the embodiment depicted in FIG. 1, the tensioning force is applied at both ends of the inflatable curtain 102 through the first and second tensioning mechanisms 104, 106. The tensioning mechanisms 104, 106 may be attached to the vehicle body. The first tensioning mechanism 104 provides a tensioning force along the mounting surface and away from the center of the inflatable curtain 102, towards the front end of the vehicle. The second tensioning mechanism 106 also provides a tensioning force along the mounting surface away from the center of the inflatable curtain 102, but towards the rear end of the vehicle. Alternatively, only one tensioning mechanism may be used to provide the tension necessary to maintain the inflatable curtain 102 in its mounted position.

The tensioning mechanisms 104, 106 may comprise a ratcheting device pulled to a certain load to create tension on the inflatable curtain 102. Alternatively, tensioning mechanisms 104, 106 may comprise a threaded fastener, such that rotating the threaded fastener in a first direction provides a certain torque to create tension on the inflatable curtain 102. In one embodiment, a tether 116 may be affixed directly to the inflatable curtain 102 adjacent the mounting surface. Alternatively, tether 116 may be attached to an attachment tab 118 that is affixed to or integrated with inflatable curtain 102. The tether may be a strip, cord or cable formed optionally of fabric, plastic or metal. The tether 116 or combination of tether 116 and attachment tab 118 may comprise an attaching element that interconnects each tensioning mechanism 104, 106 and the inflatable curtain 102.

During installation, the tensioning force is applied longitudinally along the top edge 112 or mounting surface of the inflatable curtain 102. The tensioning mechanism 104, 106 may include a spool 120 which winds up the tether 116 as the tensioning force is applied. Spool 120 may comprise the ratcheting device or threaded fastener heretofore disclosed. Additional tensioning mechanism devices may be similarly used, such as an over running clutch, or torsion bar similar to those used as seat belt tensioners.

The use of a tensioning mechanism 104, 106 when installing an inflatable curtain 102, or alternative airbag, may minimize the need for additional hardware, such as fasteners that are typically used at each attachment point along the top edge 112 of the inflatable curtain 102. This may also decrease the assembly and installation time associated with inflatable curtains 102, since the tensioning force may supersede the need to install fasteners at each attachment point of the inflatable curtain 102.

Figure 2:
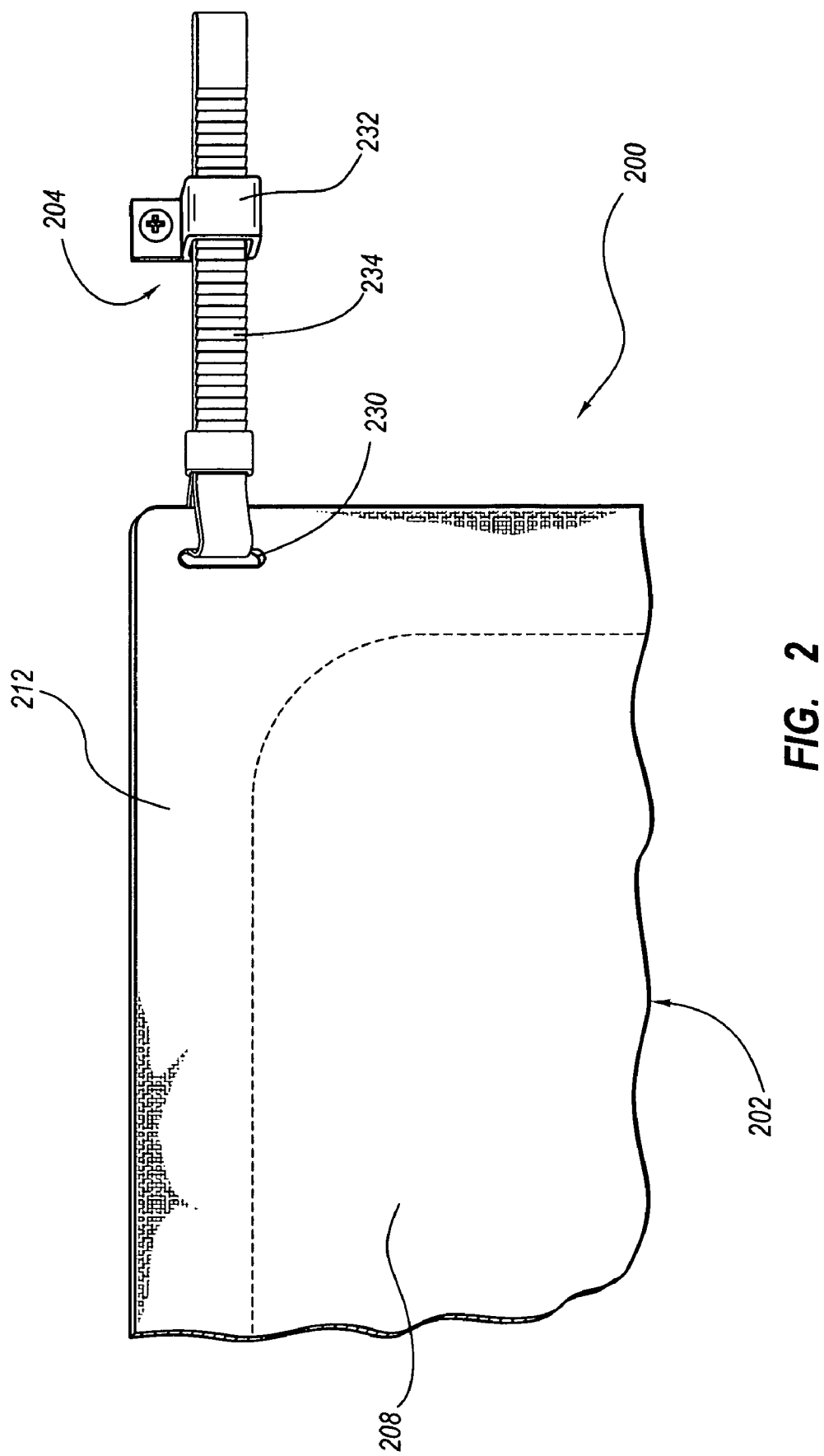
FIG. 2 is a partially cut-away side elevation view of an inflatable curtain airbag coupled to another embodiment of a tensioning mounting mechanism.

FIG. 2 depicts an alternative embodiment of an airbag assembly 200 as shown from a partially cut-away side elevation view. The airbag assembly 200 comprises an inflatable curtain airbag 202 coupled to another embodiment of a tensioning mounting mechanism 204. As with the inflatable curtain described in FIG. 1, inflatable curtain 202 includes an inflatable portion comprising inflatable chambers 208 and an uninflatable portion along the edges of the curtain 202 and defining the inflatable chambers 208. The top edge of the inflatable curtain 202 may comprise a mounting surface 212 which is mounted to or adjacent the roof rail of the vehicle.

The inflatable curtain 202 also includes a receiving orifice 230 disposed in the mounting surface 212 to receive a tether or similar device which is part of a tension-based airbag mounting system. The tension mounting mechanism 204 of the present embodiment comprises a one-way locking mechanism 232 similar to the head of a zip tie arrangement. The one-way locking mechanism 232 may be mounted or otherwise coupled to the vehicle body through the use of a fastener. A locking band 234 made of metal, plastic or other acceptable material may pass through the mounting orifice 230 disposed in the mounting surface 212 of the inflatable curtain 202.

The locking band 234 also passes through an opening in the one-way locking mechanism 232. The one-way locking mechanism 232 allows movement of the locking band 234 in a direction away from the center of the inflatable curtain 202, while impeding movement in the opposite direction, i.e., toward the center of the inflatable curtain 202. Accordingly, the one-way locking mechanism 232 can be pulled to a certain load to create tension in the inflatable curtain 202. The closure of the locking band 234 decreases the length of the band 234, pulling the cushion against the car body attachment hooks and/or inflator mounting, inducing a tension along the mounting surface 212 of the inflatable curtain 202.

Figure 3:
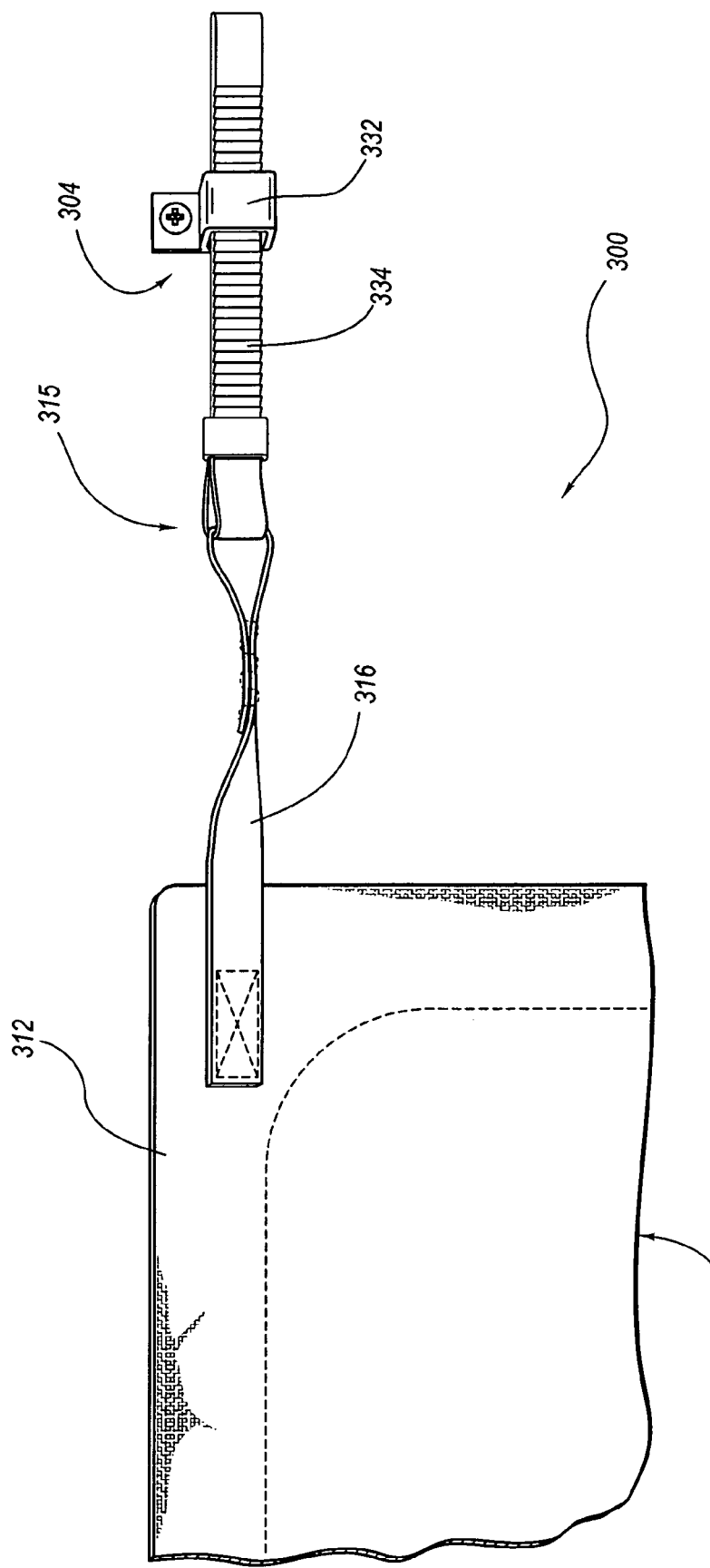
FIG. 3 is a partially cut-away side elevation view of an inflatable curtain airbag coupled to yet another embodiment of a tensioning mounting mechanism.

FIG. 3 depicts another embodiment of an airbag assembly 300 from a partially cut-away side elevation view. As with the embodiments heretofore described, the airbag assembly 300 comprises an inflatable curtain airbag 302 coupled to a tensioning mounting mechanism 304 via an attaching element 315. The inflatable curtain 302 includes an inflatable portion and an uninflatable portion. The uninflatable top edge of the curtain 302 may comprise a mounting surface 312 mounted to or adjacent to the roof rail of the vehicle.

Tensioning mechanism 304 is similar to the one-way locking mechanism described in FIG. 2. However, the attaching element 315 that interconnects the one-way locking mechanism 332 and the inflatable curtain 302 comprises a tether 316 and a locking band 334. The tether 316 may be attached directly to the mounting surface 312 through the use of fasteners, such as stitching, or alternatively, the tether 316 may comprise an integrated component of the inflatable curtain 302. The locking band 334 is coupled to the tether 316 through interconnecting loops on each end of the tether 316 and band 334. The locking band 334 may comprise a metal strap, or alternatively may be plastic, fabric or other suitable material. As with the embodiment described in conjunction with FIG. 2, the present locking band 334 may pass through an opening in the one-way locking mechanism 332. The one-way locking mechanism 332 allows movement of the locking band 334 in a direction away from the center of the inflatable curtain 302, while impeding movement in the opposite direction, i.e., toward the center of the inflatable curtain 302, thereby providing the tension to maintain the inflatable curtain 302 in its installed position adjacent the roof rail of the vehicle.

The tension mounting mechanisms 104, 106, 204, 304, including the one-way locking mechanisms 232, 332, the ratcheting devices, the threaded fasteners, the over running clutches, and the torsion bars disclosed herein are examples of means for providing tension along the mounting surface of the inflatable curtain. Furthermore, the attaching elements 315 including tethers 116, 316, locking bands 234, 334 and attachment tabs 118 disclosed herein are examples of means for interconnecting the mounting surface of the inflatable curtain to the tensioning means.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag assembly, comprising:
   an airbag including a mounting surface, the mounting surface configured to be coupled to a vehicle;
   a tensioning mechanism configured to be attached to a vehicle, wherein the tensioning mechanism comprises a one-way locking mechanism and a locking band, wherein the locking band extends through the one-way locking mechanism with a ratcheting configuration that permits the locking band to move linearly in one direction while impeding movement in the opposite direction; and
   an attaching element attached to the mounting surface and interconnecting the mounting surface and the locking band;
   wherein the tensioning mechanism is configured to provide tension along the mounting surface, the attaching element and the locking band upon installation and to keep the mounting surface, the attaching element and the locking band in a tension condition after installation such that the airbag is maintained in a desired position after installation.

2. The airbag assembly of claim 1, wherein the airbag comprises an inflatable curtain.

3. The airbag assembly of claim 2, wherein the mounting surface comprises an uninflatable edge of the inflatable curtain configured to be mounted adjacent a roof rail of a vehicle.

4. The airbag assembly of claim 3, wherein the mounting surface comprises a plurality of mounting orifices configured to receive corresponding protrusions extending from a vehicle.

5. The airbag assembly of claim 1, wherein the attaching element comprises a tether.

6. The airbag assembly of claim 5, wherein the tether is coupled to a receiving orifice disposed in the mounting surface of the airbag.

7. The airbag assembly of claim 5, wherein the attaching element further comprises an attachment tab coupled to the tether, the attachment tab being integrally formed in the mounting surface and extending therefrom.

8. The airbag assembly of claim 5, wherein the attaching element further comprises an attachment tab coupled to the tether, the attachment tab being affixed to the mounting surface and extending there from.

9. A method for installing an inflatable curtain airbag, comprising:
   positioning a mounting surface of an inflatable curtain in a mounting position adjacent the roof rail of a vehicle; and
   providing a tensioning force longitudinally along the mounting surface of the inflatable curtain when the inflatable curtain is in the mounting position,
   wherein providing a tensioning force comprises:
   actuating a tensioning mechanism coupled to an attaching element, which is attached directly to the inflatable curtain, to maintain the attaching element and mounting surface in a tensioned condition,
   wherein the tensioning mechanism comprises a one-way locking mechanism through which a locking band extends with a ratcheting configuration that permits the locking band to move linearly in one direction while impeding movement in the opposite direction, and
   wherein actuating the tension mechanism comprises ratcheting the locking band through the one-way locking mechanism.

10. The method of claim 9, wherein positioning a mounting surface of the inflatable curtain comprises engaging mounting orifices disposed on the mounting surface with corresponding protrusions extending from the vehicle.

11. The method of claim 9, wherein the attaching element comprises a tether, wherein providing a tensioning force comprises actuating another tensioning mechanism, wherein each tensioning mechanism is coupled to an opposing end of the tether, wherein the tether is attached directly to the inflatable curtain.

12. The method of claim 9, wherein providing a tensioning force longitudinally along the mounting surface comprises providing a tensioning force longitudinally along a top edge of the inflatable curtain.

13. An airbag assembly, comprising:
    an airbag including a mounting surface, the mounting surface configured to be coupled to a vehicle;
    a one-way locking mechanism configured to be attached to a vehicle; and
    a locking band extending through an opening in the one-way locking mechanism with a ratcheting configuration that permits the locking band to move linearly in one direction while impeding movement in the opposite direction;
    wherein the locking band is coupled to the mounting surface to interconnect the mounting surface and the one-way locking mechanism such that tension is provided and maintained along the mounting surface and the locking band upon installation to maintain the airbag in a desired position.

14. The airbag assembly of claim 13, wherein the airbag comprises an inflatable curtain.

15. The airbag assembly of claim 13, wherein the mounting surface comprises an uninflatable edge of the inflatable curtain configured to be mounted adjacent a roof rail of a vehicle.

16. The airbag assembly of claim 15, wherein the mounting surface comprises a plurality of mounting orifices configured to receive corresponding protrusions extending from a vehicle.

17. A method for installing an inflatable curtain airbag, comprising:
    positioning a mounting surface of an inflatable curtain in a mounting position adjacent the roof rail of a vehicle, wherein a locking band is coupled to the mounting surface;
    attaching a one-way locking mechanism to the vehicle;
    moving the locking band linearly through the one-way locking mechanism to provide a tensioning force longitudinally along the mounting surface of the inflatable curtain when the inflatable curtain is in the mounting position,
    wherein the locking band and the one-way locking mechanism have a ratcheting configuration such that the locking band moves linearly in one direction while impeding movement in the opposite direction;
    wherein the ratcheting configuration permits tension to be provided and maintained along the mounting surface and the locking band upon installation and to maintain the airbag in a desired position.

18. The method of claim 17, wherein positioning a mounting surface of the inflatable curtain comprises engaging mounting orifices disposed on the mounting surface with corresponding protrusions extending from the vehicle.

19. The method of claim 17, wherein providing a tensioning force longitudinally along the mounting surface comprises providing a tensioning force longitudinally along a top edge of the inflatable curtain.

* * * * *